United States Patent [19]

Duda et al.

[11] 4,411,057
[45] Oct. 25, 1983

[54] METHOD OF MANUFACTURING A LASER SOURCE WITH STAMPED SUPPORT

[75] Inventors: Eugène Duda; Claude Tondu; Alain Maumy, all of Paris, France

[73] Assignee: Thomson-CSF, Paris, France

[21] Appl. No.: 312,971

[22] Filed: Oct. 20, 1981

Related U.S. Application Data

[63] Continuation of Ser. No. 39,745, May 16, 1979, abandoned.

[30] Foreign Application Priority Data

May 18, 1978 [FR] France .................................. 78 14762

[51] Int. Cl.³ ...................... H01L 21/58; H01L 23/36; H01L 33/00
[52] U.S. Cl. ..................... 29/569 L; 29/581; 29/591; 29/DIG. 37; 72/412; 357/81; 372/36
[58] Field of Search .................. 29/569 L, 581, 591, 29/DIG. 37; 357/81; 350/96.17; 72/412, 414, 376, 469, 478, 700, 701; 372/36

[56] References Cited

U.S. PATENT DOCUMENTS

| 436,187 | 9/1890 | Pennock | 72/414 X |
| 3,840,889 | 10/1974 | O'Brien et al. | 372/36 |
| 4,027,521 | 6/1977 | McKee et al. | 72/412 X |
| 4,156,206 | 5/1979 | Comerford et al. | 372/36 X |
| 4,186,994 | 2/1980 | Denkin et al. | 350/96.17 |

FOREIGN PATENT DOCUMENTS 52-3391 1/1977 Japan ...................................... 372/36

OTHER PUBLICATIONS

Crow, J. D., "Integral Source/Receiver Package for Optical Data", IBM-T.D.B., 20(5), 10-1977, p. 2089.
Balliet, L. et al. "Self Aligning Edge Emitter for Fiber Optics", IBM-T.D.B. 23(7B), 12-1980, p. 3104.

*Primary Examiner*—L. Dewayne Rutledge
*Assistant Examiner*—Alan E. Schiavelli
*Attorney, Agent, or Firm*—Cushman, Darby & Cushman

[57] ABSTRACT

The invention relates to laser sources using a semiconductor chip from which the radiation is collected by an optical fiber. In accordance with the invention there is provided a laser source in which the support for the semiconductor chip and the optical fiber is metallic. The support is stamped with an impression comprising a seat for the semiconductor chip and at least one groove for accommodating the optical fiber. The invention is applicable to radiation sources used in optical telecommunication systems.

2 Claims, 8 Drawing Figures

METHOD OF MANUFACTURING A LASER SOURCE WITH STAMPED SUPPORT

This is a continuation, of application Ser. No. 39,745 filed May 16, 1979, to be abandoned as of the filing date accorded this application.

This invention relates to laser radiation sources using a photoemissive semiconductor chip having two cleaved faces building up an optical cavity. When forward biased this structure produces coherent radiation which is emitted through a very small rectangular aperture centered on the axis of the optical cavity.

In the case of a laser head, the radiation emitted is collected at the end of an optical fiber fixed to the support carrying the semiconductor chip.

To obtain accurate mounting, it is possible to use a silicon support in the surface of which have been etched both the seat for the semiconductor chip and the V-shaped recesses intended to receive the optical fiber and the coupling lens, if any, used to channel the radiation. The removal of heat by means of a silicon support is inadequate to enable the radiation source to operate at a high power level. In addition, this technique is relatively onerous because the production of the silicon support represents a substantial part of the price of an optical fiber laser head.

In order to obviate these disadvantages, it is proposed in accordance with the invention to mount the semiconductor chip on a metallic support made of a cold-malleable material of high thermal conductivity. The seat for this laser chip and the recesses for the optical fibers are formed in a single operation by stamping the surface of the metallic support.

In accordance with the present invention, there is provided a semiconductor laser source comprising on a support a laser chip and at least one optical fiber for collecting the radiation supplied from said laser chip; said support being made of a cold-malleable metal of high thermal conductivity; said support carrying a stamping having a flattened area and at least one groove; said stamping resulting from the permanent deformation of said cold malleable metal; said laser chip being supported by said flattened area and said optical fiber being supported by the walls of said groove.

For a better understanding of the present invention, and to show how the same may be carried into effect, reference will be made to the following description in conjunction with the accompanying drawings, among which:

Figure 1:
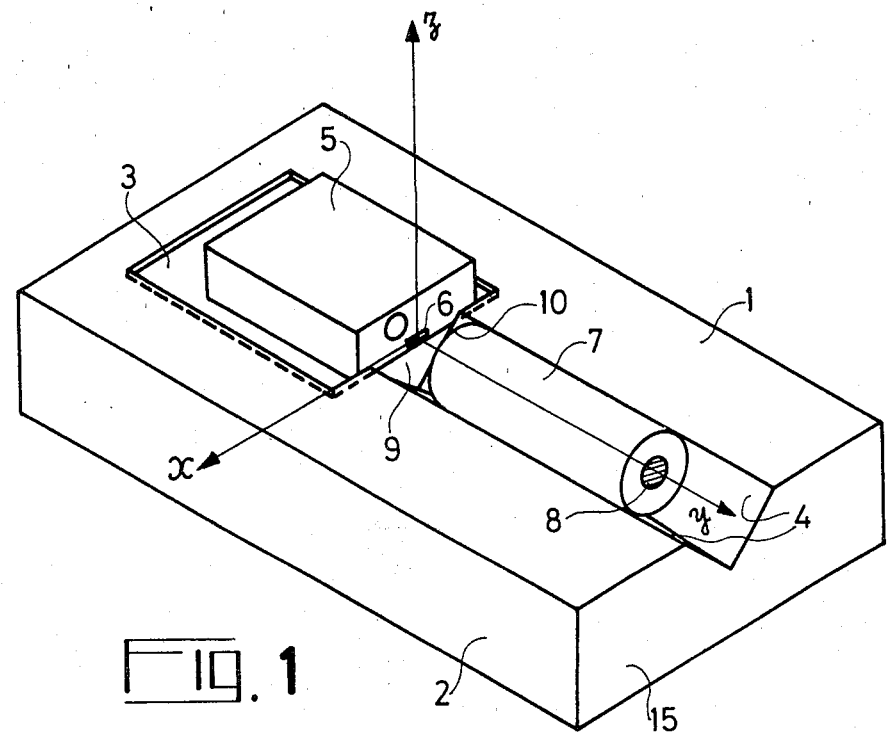
FIG. 1 is an isometric view of a semiconductor laser source.
Figure 2:
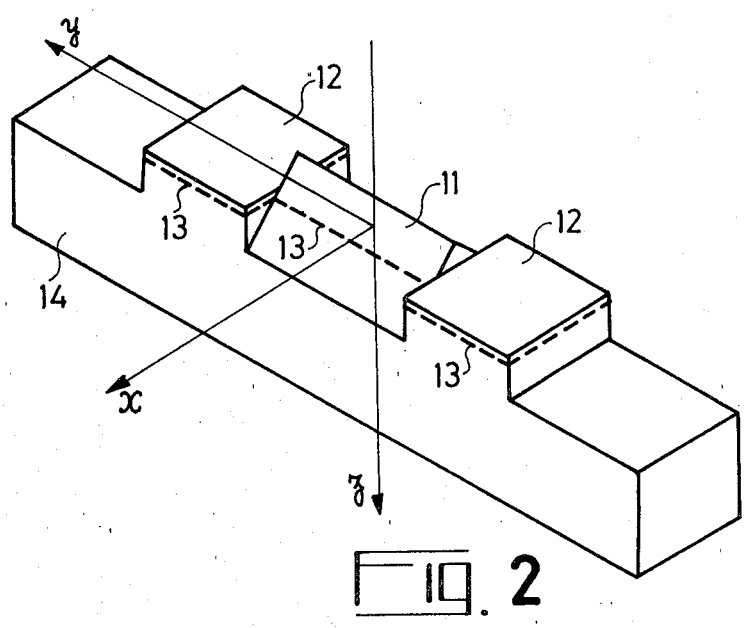
FIG. 2 is an isometric view of a symmetrical die for stamping supports for laser sources.

FIG. 1 shows a support 2 on the surface 1 of which has been formed an impression composed of a flattened area 3 acting as a seat for a laser chip 5 and of a V-shaped groove 4 acting as a recess for an optical fiber 7, 8. The laser chip 5 emanates light from the collective production of a semiconductor structure which is capable of emitting an optical radiation when an electrical current is passed through it in the forward direction. The faces of the chip 5 which are parallel to the plane oxy are cleaved and act as mirrors delimiting an optical cavity of axis oy. The laser emission of the chip 5 takes place through a small aperture 6 having a center O on the axis oy. In order to obtain a good transfer of radiated energy, the core 8 of the optical fiber has to be centered on and aligned with the axis oy. The cladding 7 of the optical fiber and the groove 4 are thus dimensioned accordingly, taking into account the position of the seat 3 and the distance between the center O of the aperture 6 and the supporting face of the laser chip 5. The end 10 of the optical fiber 7, 8 is cut and positioned in such a way that the energy of the divergent beam emitted through the aperture 6 can be propagated in the core of the fiber. To this end, the edge 9 and the trough-like shape of the seat 3 enable the chip 5 and the fiber 7, 8 to be precisely positioned at x and y. The positioning at z of the laser chip 5 and the optical fiber 7, 8 is obtained by forming the impression 3, 4 in a single stamping operation. To this end, the support 2 is made of a cold-malleable metal and the impression 3, 4 is obtained by means of a stamping tool provided at its end with an extremely hard die, as illustrated in FIG. 2.

The die 14 is formed for example by a block of tempered steel of which the upper part is machined symmetrically in relation to the direction z which is the direction in which the stamping force is applied. In order to obtain this symmetry, which ensures that the tool does not overhang during the impression transfer operation, two supports are simultaneously produced from a blank of metal having twice the necessary length. After stamping, the two supports are separated by cutting along the face 15 shown in FIG. 1.

The impression shown in FIG. 1 is obtained by means of the die 14 by machining a Vee 11 twice as long as the required groove. The dihedron formed by the faces of the Vee 11 may have for example an opening angle of from 70° to 120°. The Vee 11 is symmetrically flanked by two coplanar lands 12. The dotted line 13 represents in highly exaggerated form the depth of penetration reached during the stamping operation. The stamping force is sufficient when the two lands 12 have flattened the surface irregularities of the support, although it may be increased to obtain a slight raised edge, enabling the laser chip 5 to be positioned at x and y. For example, it is possible with a copper support to obtain an impression measuring 7 mm$^2$ with a stamping force of the order of 300 Newton.

Figure 3:
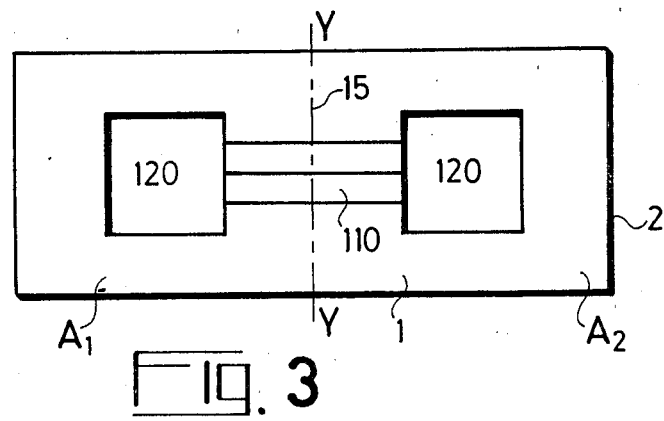
FIG. 3 is a plan view of the support after stamping and before cutting.

FIG. 3 shows the impression obtained after cutting of the supports $A_1$ and $A_2$ along Y—Y. On its surface 1, the blank 2 has two troughs 120 connected by a groove 110. It would also be possible to provide a groove 110 extending on either side of the troughs 120. This variant makes it possible to utilize the radiation emitted by the two faces of the optical cavity of the laser chip 5. In this case, two optical fibers are mounted on the support, one acting for example as an optical negative feedback loop. According to the invention, the die shown in FIG. 2 may be formed by providing a single land 12 flanked by two Vees' 11 or even by replacing the central Vee by two Vees' flanking the two lands 12 of the die 14.

Figure 4:
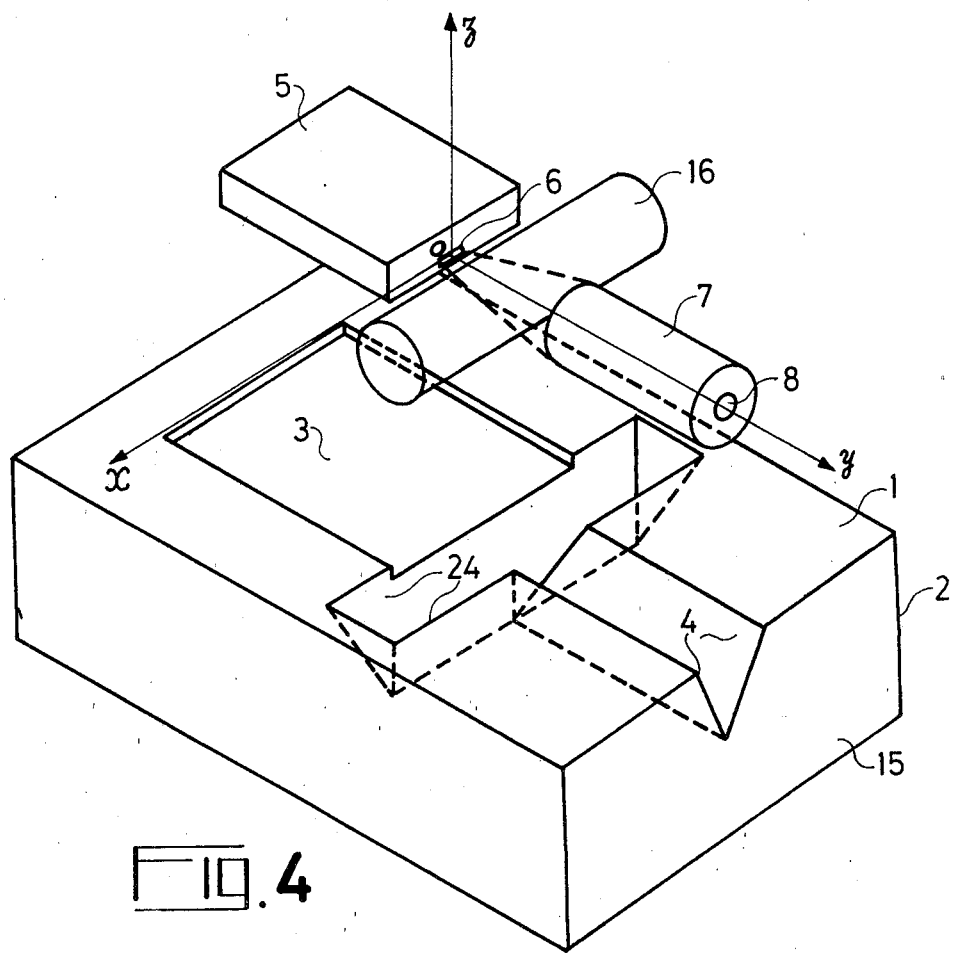
FIG. 4 is an isometric view of a variant of the support for a laser head and of the optical elements which it serves to position.

FIG. 4 shows another variant of the laser source according to the invention. This variant differs from the variant shown in FIG. 1 in the presence of a fiber 16 and a recess 24 disposed between the seat 3 and the groove 4. The function of the fiber 16 is to focus the radiation emitted through the aperture 6 in order to collect as much energy as possible in the core 8 of the optical fiber 7, 8. The fiber 16 which acts as a cylindrical lens produces an anamorphosis of the cross-section of the radiated beam.

Figure 5:
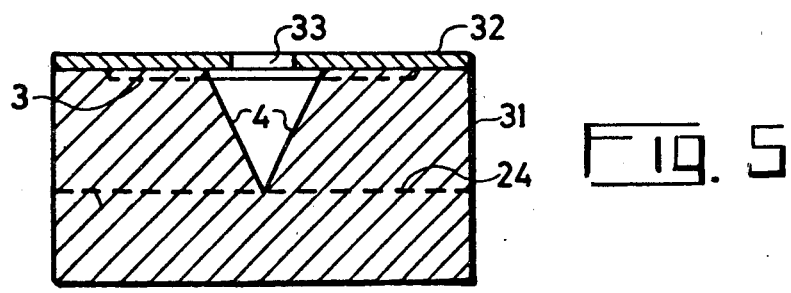
FIGS. 5, 6 and 7 illustrates the successive steps involved in the formation of a die.
Figure 6:
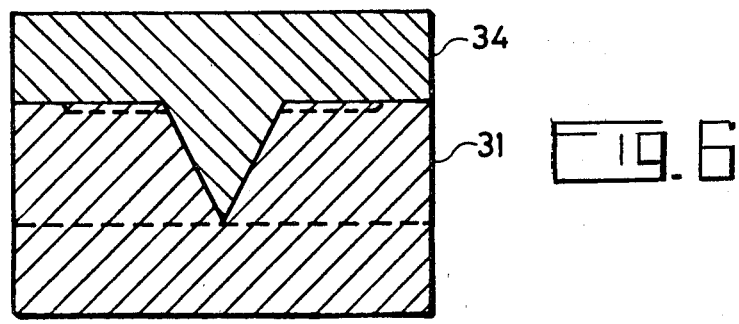

The formation of a die capable of transferring the impression 3, 24, 4 in a single operation involves problems where it is carried out by conventional machining. However, a die such as this may be formed from a molding support of silicon which reproduces the sunk impression visible in FIG. 4. The silicon crystal is cut along a section (1, 0, 0). The surface of the silicon block 31 is masked, as shown in FIG. 5. The mask 32 comprises rectangular apertures 33 of which the sides are oriented in directions of the assembly <1, 1, 0>. These apertures correspond to the various parts of the impression to be formed. Etching of the silicon produces a Vee-shaped or trapezoidal depression which materializes the trough 3 and the grooves 4 and 24. FIG. 6 shows the molding support 31 freed from its mask 32 and covered by an electrolytic deposit of iron 34. After separation from the support 31, the electrolytic deposit 34 is subjected to a nitriding operation which is intended to harden the active faces 35 of the reverse impression.

Figure 7:
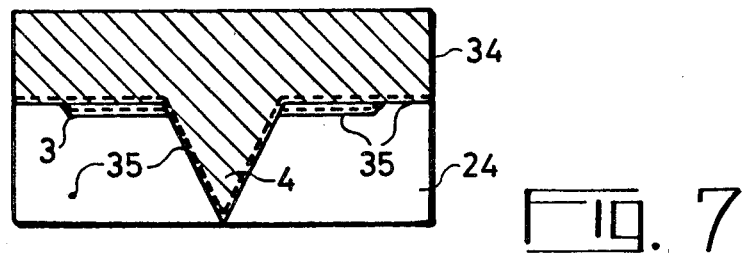

FIG. 7 shows the nitrided die ready for use.

Figure 8:
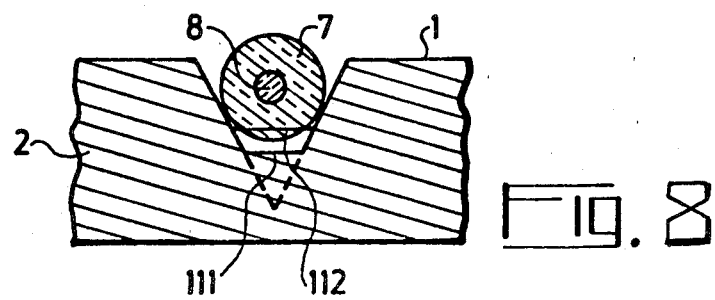
FIG. 8 illustrates a detail of a stamped support.

As shown in FIG. 8, the profile of a groove may be trapezoidal with bases 111 or 112 separated by a vertical face acting as a stop for the positioning of the fiber 7, 8. The etching operation by which the silicon mold is formed produces a perfectly flat seat for the laser chip 5 and likewise inclined sides for the optical fiber 7, 8.

The most suitable materials for making the support are, in decreasing order of malleability, gold, silver, aluminium and copper. These metals have the high conductivity required for removing the heat given off by the laser chip.

The technique which has just been described provides without difficulty for an accuracy in the positioning of the laser and fiber of the order of one micron and for a particularly favorable cost price.

By virtue of the heat-dissipating function of the metallic support, it is possible to produce laser sources of considerably higher power than laser sources produced from a silicon support. The surface condition and the preliminary machining of the metallic blank are in no way critical because stamping established all the conditions required for precise positioning in a single operation.

What we claim is:

1. A method of manufacturing a semiconductor laser source including a laser chip and at least one optical fiber for collecting the radiation supplied from said laser chip on a support made of a cold-malleable metal of high thermal conductivity, said method comprising the steps of:
   stamping, in a single operation, said support to permanently deform said support to have on a surface of said support, a flattened area and at least one Vee-shaped groove, acting as a recess for said optical fiber;
   disposing said chip on said flattened area; and
   disposing said at least one optical fiber in said at least one Vee-shaped groove, said stamping step forming said flattened area at such a depth below said surface and said Vee-shaped groove at such a width and depth below said surface that light emitted from said chip is directed to said at least one fiber.

2. A method of manufacturing a semiconductor laser source including a laser chip and at least two optical fibers for collecting the radiation supplied from said laser chip on a support made of a cold-malleable metal of high thermal conductivity, said method comprising the steps of:
   stamping, in a single operation, said support to permanently deform said support to have on a surface of said support, a flattened area and at least first and second Vee-shaped grooves, said first Vee-shaped groove being disposed between said flattened area and said second Vee-shaped groove;
   said first Vee-shaped groove being disposed between said flattened area and said second Vee-shaped groove;
   disposing said chip on said flattened area;
   disposing one of said at least two optical fibers in said first Vee-shaped groove; and
   disposing another of said at least two optical fibers in said second Vee-shaped groove;
   said stamping step forming said flattened area at such a depth below said surface and said Vee-shaped grooves at such a width and depth below said surface that light emitted from said chip is directed to first said one fiber acting as a cylindrical lens and then to said another fiber.

* * * * *